United States Patent [19]
Gebeke

[11] 4,323,207
[45] Apr. 6, 1982

[54] LATCH ASSEMBLY FOR A VIDEO TAPE CASSETTE

[75] Inventor: Charles D. Gebeke, White Bear Lake, Minn.

[73] Assignee: Minnesota Mining and Manufacturing Company, St. Paul, Minn.

[21] Appl. No.: 795,867

[22] Filed: May 11, 1977

[51] Int. Cl.³ .................... G03B 1/04; G11B 15/32
[52] U.S. Cl. ................................. 242/198; 206/389
[58] Field of Search ............. 242/198, 199, 200, 197; 360/85, 95, 132; 220/334, 339, 326; 206/389

[56] References Cited

U.S. PATENT DOCUMENTS

| | | | |
|---|---|---|---|
| 2,479,917 | 8/1949 | Feurer | 220/326 |
| 3,661,250 | 5/1972 | Lyman | 206/389 |
| 3,809,219 | 5/1974 | Esashi | 220/326 |
| 3,841,518 | 10/1974 | Hines | 220/326 |
| 3,841,674 | 10/1974 | Bisbing et al. | 292/175 |
| 3,844,445 | 10/1974 | Haas | 220/326 |

Primary Examiner—Leonard D. Christian
Attorney, Agent, or Firm—Cruzan Alexander; Donald M. Sell; William L. Huebsch

[57] ABSTRACT

A latch assembly for the access door of a video tape cassette. The latch assembly includes an integral member of a polymeric material including a generally rigid body portion slidably mounted in a housing of the cassette and having a projection adapted to engage and hold the access door in a closed position, and a flexible resilient spring portion adapted for biasing the body portion to a position at which the projection can engage the door.

1 Claim, 12 Drawing Figures

LATCH ASSEMBLY FOR A VIDEO TAPE CASSETTE

BACKGROUND OF THE INVENTION

This invention relates to latch assemblies for the access door on a video tape cassette of the type used in a video recording and playback machine, such as the "U-Matic" cassette developed by Sony Corporation and described in U.S. Pat. No. 3,740,495.

As is illustrated in FIGS. 1 and 2 of the drawing, a prior art video tape cassette 10 typically comprises a length 11 of magnetizable recording tape, two reels 12 each supporting a different helically wound end portion of the length 11 of tape, and a generally rectangular housing 14 enclosing and supporting the reels 12 for rotation to transfer tape between the reels 12. The housing 14 includes an outer front wall having a generally planar end portion 16, a recessed portion 18 defining a tape access area along the outer surface of the housing 14, and means for guiding tape between the reels 12 through the outer wall and across the recessed portion 18 to afford access thereto by the mechanism of a video tape recording/playback machine. A door 20 is pivotably mounted on the housing 14 via a hinge 21 for movement between a closed position over tape extending through the tape access area (to which closed position the door 20 is biased by a spring 22) and an open position spaced from the tape access area.

A latch assembly (FIG. 2) releasably retains the door 20 in its closed position. The latch assembly comprises a channel 24 defined by an L-shaped protrusion located on the edge of the door 20 opposite the hinge 21 and adjacent the planar end portion 16, and a movable member (such as the movable member 26 shown in FIG. 2) mounted on the housing 14 for movement between an engaged position to which the movable member is biased and a disengaged position to correspondingly move the movable member in or out of engagement with the channel 24 when the door 20 is in its closed position. The movable member has a cam surface (such as the surface 30 shown in FIG. 2) adapted for engagement by a projection on a recording/playback machine through an access opening 32 in the planar end portion 16 to move the member to its disengaged position so that the access door can be opened by the machine into which the cassette 10 is inserted.

In one prior art cassette described in U.S. Pat. No. 3,873,045 the movable member is a lever pivotably mounted on the housing, whereas in the prior art cassette illustrated in FIG. 2 (which is believed to be the closest prior art to the present invention), the movable member 26 is slidably mounted in the housing 14 and includes a projection 27 adapted to engage the channel 24. Both of these prior art latch assemblies include a separable metal wire coil spring (such as the spring 34 shown in FIG. 2) to bias them to their engaged position, resulting in a latch assembly which requires assembly time to position the spring between the movable member and the housing, and which is more costly to produce than might otherwise be desired.

SUMMARY OF THE INVENTION

According to the present invention there is provided an improved latch assembly for an access door of a video cassette which latch assembly is less costly and easier to assemble into a cassette than the prior art latch assemblies described above.

The improved latch assembly according to the present invention is for the access door of a video tape cassette of the type described above, which door is pivotably mounted on a housing of the cassette for movement between a closed position over a tape access area (to which closed position the door is biased) and an open position spaced from the tape access area. Like the prior art assembly shown in FIG. 2 and described above, the latch assembly comprises a channel on the door, a movable member including a projection slidably mounted in the housing for movement relative to the door between (1) an engaged position with a projection on the movable member positioned to enter the channel when the door is in its closed position to retain the door in its closed position, and (2) a release position with the projection on the movable member spaced from the door; and means for biasing the movable member to its engaged position. In the improved latch assembly, however, the movable member and the means for biasing the slide member to its engaged position are an integral unit of flexible resilient polymeric material, with a relatively stiff body portion providing the movable member slidably mounted within the housing, and a resilient flexible spring portion having one end joining the body portion, its other end adapted to engage the housing, and an arcuate portion between its ends which may be bent to bias the body portion toward its engaged position.

BRIEF DESCRIPTION OF THE DRAWING

Both the prior art and the present invention are described herein with reference to the accompanying drawing, wherein like numbers refer to like parts in the several views, and wherein.

DESCRIPTION OF THE PREFERRED EMBODIMENT

Figure 2:
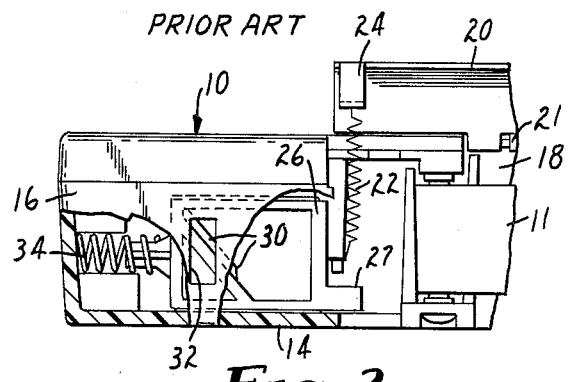
FIG. 2 is an enlarged fragmentary view of the video tape cassette of FIG. 1 having parts broken away to illustrate a prior art latch assembly for its access door.
Figure 1:
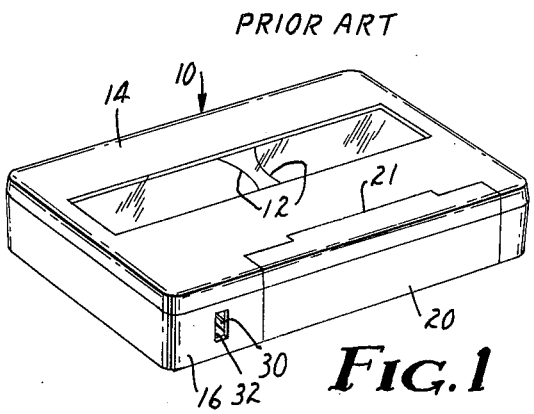
FIG. 1 is a perspective view of a prior art video tape cassette.
Figure 3:
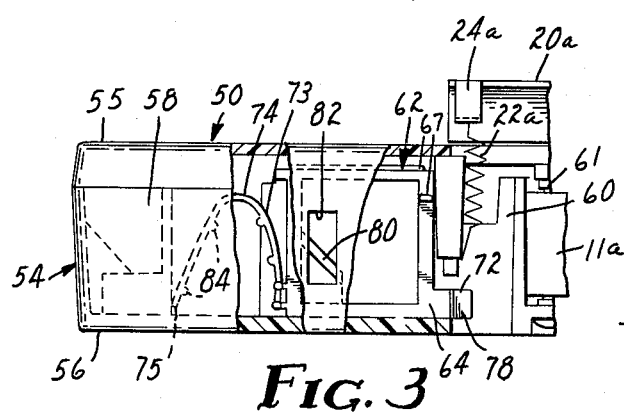
FIG. 3 is a fragmentary front view of a tape cassette including a latch assembly according to the present invention and having parts broken away to show details.
Figure 4:
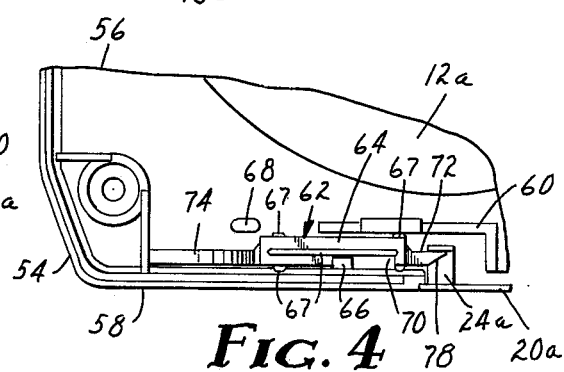
FIG. 4 is a fragmentary top view of the tape cassette of FIG. 3 having a top half of the housing removed to show details of the latch assembly according to the present invention.
Figure 6:
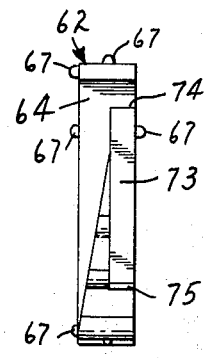
FIGS. 6, 7 and 8 are respectively a left end view, a right end view and a bottom view of the integral movable member and biasing means illustrated in FIG. 5.
Figure 5:
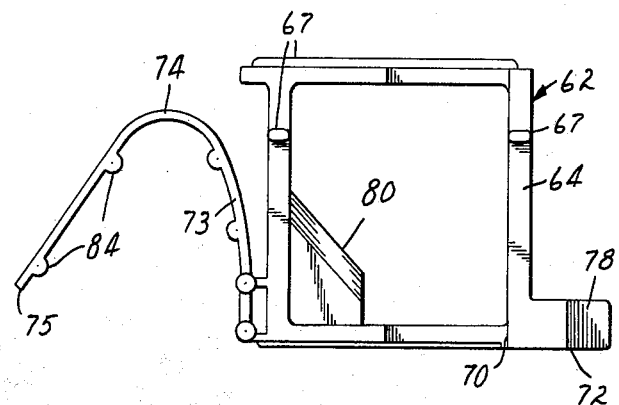
FIG. 5 is an enlarged elevational front view of an integral movable member and biasing means in the latch assembly illustrated in FIG. 3.
Figure 7:
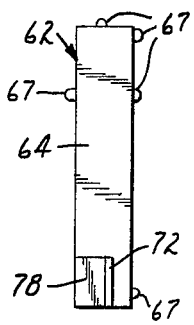
Figure 8:
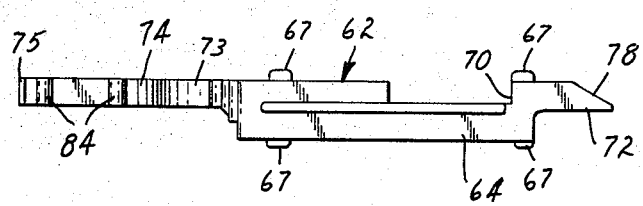
Figure 12:
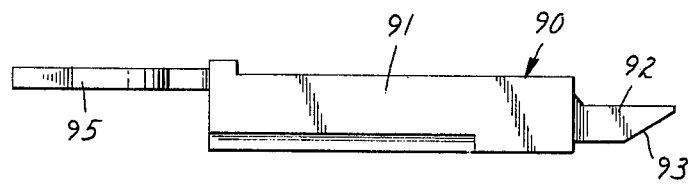
FIGS. 10, 11 and 12 are respectively a left end view, a right end view and a top view of the integral movable member and biasing means of FIG. 9.
Figure 9:
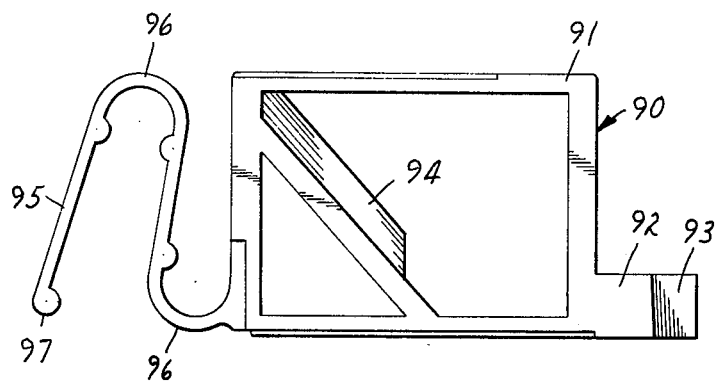
FIG. 9 is an elevational front view of an alternate embodiment for the integral movable member and biasing means in a latch assembly according to the present invention.
Figure 10:
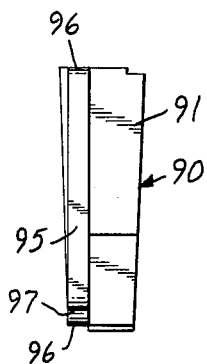
Figure 11:
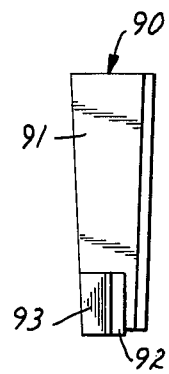

Referring now to FIGS. 3 and 4 there is illustrated a video tape cassette 50 similar to the tape cassettes illustrated in FIG. 1 and in U.S. Pat. No. 3,873,045, but which includes a latch assembly according to the present invention. Parts of the cassette 50 which are identical to parts of the cassette 10 are similarly numbered, except for the addition of the suffix "a".

Like the cassette 10, the video tape cassette 50 includes a predetermined length of magnetizable recording tape 11a, two reels 12a each supporting a different helically wound end portion of the length of tape, and a generally rectangular housing 54 having separable upper and lower parts 55 and 56 enclosing and supporting the reels 12a for rotation to transfer tape between the reels. The housing 56 includes a front wall having a generally planar end portion 58 and a recessed portion 60 defining a tape access area, and means including some guide pins 61 for guiding tape 11a between the reels 12a through the outer wall and across the tape access area to afford access thereto by the record/playback mechanism of a machine into which the cassette 50 is inserted. Also the cassette 50 includes a door 20a, a hinge pivotably mounting the door 20a on the housing 54 for movement between a closed position over the tape access area and an open position spaced from said access area, and a spring 22a which provides means for biasing the door 20a to its closed position.

The modified latch assembly for releasably retaining the door 20a in its closed position comprises a channel 24a defined by an L-shaped protrusion located on the edge of the door 20a opposite the hinge adjacent the planar end portion 58, and an integral movable member and biasing means 62 according to the present invention. The integral movable member and biasing means 62 includes a stiff generally rectangular body portion 64 slidably mounted in the housing 54 in a slot defined between the planar end portion 58 of the front wall, a post 68, and a part of the recessed portion 60 of the front wall that extends adjacent the end portion 58. The body portion has projecting lugs or rails 67 which limit surface contact between the body portion 60 and housing 54. A stop block 66 projecting from the rear of the planar end portion 58 is positioned in a slot 70 in the body portion 64, the length of which slot 70 permits sliding movement of the body portion 64 between (1) an engaged position at which a projection 72 included in the body portion 64 will enter the channel 24a when the door 20a is in its closed position to retain the door 20a in its closed position; and (2) a release position at which the projection 72 is in a position at which the door 20a may be moved from its closed to its open position. Also, the integral slide member and biasing means 62 includes a flexible resilient spring portion 73 having one end joining its body portion 64, an opposite end 75 adapted to engage the housing 54 and an arcuate part 74 between its ends which may be resiliently bent as the body portion 64 moves toward the end 75 so that the spring portion 73 provides means for biasing the body portion 64 to its engaged position.

Like the movable member 26 of the prior art latch assembly described above, the body portion 64 includes a cam surface 80 adapted for engagement through an opening 82 in the planar end portion 58 of the front wall to move the body portion 64 to its disengaged position and allow the door 20a to be opened by a machine into which the cassette is inserted.

Also provided on the body portion 64 is a first cam surface 78 on the projection 72 adapted to be engaged by an edge of the L-shaped channel 24a so that the body portion 64 will be moved to its disengaged position and into engagement with the channel 24a as the door 20a is moved to its closed position. This feature conveniently allows the door 20a to latch itself under the influence of the spring 22a after the door 20a has been opened outside of a video record/playback machine by a person wishing to inspect the tape access area.

The integral movable member and biasing means 62 is molded of a polymeric material, such as acetal, which will form a flexible resilient spring portion 73 while providing a relatively stiff body portion 64. When made from acetal, the arcuate part 74 of the spring portion 73 is preferably about 0.09 inch wide and 0.036 inch thick to provide the desired force to reliably move the body portion 64 to its engaged position. Arcuate parts 74 much less in cross sectional area have been found to take a set and thus are unreliable, whereas those which are substantially larger (particularly in thickness) become too stiff. Also, the spring portion 73 has a plurality of arcuate projections 84 which facilitate molding.

FIGS. 9, 10, 11 and 12 illustrate an alternate embodiment of an integral movable member and biasing means 90 particularly adapted for use in a video tape cassette which is smaller than the cassette 50, such as the cassette illustrated in FIG. 1 and described in U.S. Pat. No. 3,869,099.

Like the integral member and biasing means 62 illustrated in FIGS. 3 through 8, the integral movable member and biasing means 90 also includes a body portion 91 adapted to be slidably mounted in a housing of a cassette which body portion 91 has a projection 92 adapted to engage a door of the cassette and first and second cam surfaces 93 and 94 adapted to perform the function of the cam surfaces 78 and 80 of the body portion 64. Also, the integral movable member and biasing means 90 includes a flexible resilient generally S-shaped spring portion 95 having one end joining its body portion 91, an opposite end 97 adapted to engage the housing, and two arcuate parts 96 between its ends which may be resiliently bent as the body portion 91 moves toward the end 97 so that the spring portion 95 can provide means for biasing the body portion 91 towards an engaged position. The two arcuate parts 96 allow the spring portion 95 to provide even and adequate spring pressure for biasing the body portion 70 while having a shorter spring portion 95 length in the direction of travel of the body portion 91 than the arched spring portion 73. This shorter length of the spring portion 95 facilitates use of the integral movable member and biasing means in a smaller video cassette of the type described in U.S. Pat. No. 3,869,099.

The integral movable member and biasing means 90 is also integrally molded of a resilient flexible polymeric material such as acetal, with the arcuate parts 96 of the spring portion 95 preferably having a thickness of about 0.04 inch and width of about 0.06 inch.

I claim:

1. In a video tape cassette comprising a length of magnetizable recording tape, two reels each supporting a different helically wound end portion of said tape, a generally rectangular housing enclosing and supporting said reels for rotation to transfer tape between said reels, said housing including an outer front wall having a generally planar end portion, a recessed portion and means for guiding tape between said reels through said outer wall and across said recessed portion to provide a tape access area, a door, a hinge pivotally mounting said door on said housing for movement between a closed position over said tape access area and an open position spaced from said tape access area, means for biasing said door to said closed position, and latch means for releasably retaining said door in said closed position comprising a channel on the edge of said door opposite said hinge adjacent said planar end portion, a movable member slidably mounted in said housing for straight line movement along said planar end portion between engaged and disengaged positions, said movable member including a projection adapted to enter said channel when said door is in said closed position to retain said door in said closed position and a cam surface adapted for engagement through said planar end portion to move said movable member to said disengaged position, and means for biasing said movable member to said engaged position, the improvement wherein said movable member and said means for biasing said movable member to said engaged position are an integral unit of flexible resilient polymeric material with said movable member being a relatively rigid movable portion of said unit, and said means for biasing being an elongate portion of said unit having one end joining said movable portion, an opposite end adapted to engage said housing, and an arcuate generally U-shaped part which is resiliently bent to bias said movable portion toward said engaged position.

* * * * *